United States Patent [19]

Frampton

[11] Patent Number: 5,802,351
[45] Date of Patent: Sep. 1, 1998

[54] DATA INTERFACE

[75] Inventor: Simon Frampton, Surrey, England

[73] Assignee: Nokia Mobile Phones Limited, Salo, Finland

[21] Appl. No.: 596,720

[22] Filed: Feb. 5, 1996

[30] Foreign Application Priority Data

Feb. 14, 1995 [GB] United Kingdom ............ 9502823

[51] Int. Cl.$^6$ ................................................ G06F 13/00
[52] U.S. Cl. ................ 395/500; 395/200.16; 395/384; 395/387
[58] Field of Search ................................ 395/500, 477, 395/800, 200.16, 384, 387; 364/131; 370/62, 259; 379/58, 59

[56] References Cited

U.S. PATENT DOCUMENTS

| | | | |
|---|---|---|---|
| 4,158,235 | 6/1979 | Call et al. | 364/900 |
| 4,285,038 | 8/1981 | Suzuki et al. | 364/200 |
| 4,862,407 | 8/1989 | Fette et al. | 395/800 |
| 4,945,556 | 7/1990 | Namekawa | 379/58 |
| 4,962,483 | 10/1990 | Lodhi | 365/221 |
| 5,263,178 | 11/1993 | Liukkonen | 455/76 |
| 5,333,176 | 7/1994 | Burke et al. | 379/58 |
| 5,422,931 | 6/1995 | Austin-Lazarus et al. | 379/59 |
| 5,446,772 | 8/1995 | Korhonen | 375/257 |
| 5,453,986 | 9/1995 | Davis et al. | 370/62 |
| 5,497,373 | 3/1996 | Hulen et al. | 370/259 |
| 5,537,576 | 7/1996 | Perets et al. | 395/477 |

FOREIGN PATENT DOCUMENTS

| | | |
|---|---|---|
| 0153553 A2 | 9/1985 | European Pat. Off. . |
| 0195598 A2 | 9/1986 | European Pat. Off. . |

OTHER PUBLICATIONS

Patent Abstracts of Japan, vol. 010, No. 106 (p–449), 22 Apr. 1986, JP A 60 237566 (Oki Denki Kogyo KK).
Patent Abstracts of Japan, vol. 018, No. 110 (p–1698), 22 Feb. 1994, JP A 05 303524 (NEC Corp. Others:01).
Patent Abstracts of Japan, vol. 015, No. 277 (e–1089), 15 Jul. 1991, JP A 03 095916 (Fujitsu Ltd.).
Patent Abstracts of Japan, vol. 015, No. 251 (p–1220), 26 Jun. 1991, JP A 03 081851 (Seiko Instr Inc).

Primary Examiner—Kevin J. Teska
Assistant Examiner—Russell W. Frejd
Attorney, Agent, or Firm—Perman & Green, LLP

[57] ABSTRACT

A data buffer (23) is positionable between processing devices, such as microcontroller (21) and a digital signal processor (22). Messages are transmitted between the devices via a dual port RAM buffer (31). The amount of storage allocated for transfers in each direction is adjustable via a size register (42) so that, at any particular time, the optimum amount of storage is provided for a transfer in a particular direction. The buffer is particular suited to applications in mobile telephones.

10 Claims, 4 Drawing Sheets

DATA INTERFACE

BACKGROUND TO THE INVENTION

The present invention relates to a data interface positionable between a first processing means and second processing means.

A trend in recent years has been towards distributed systems, in which a plurality of independently programmable processing devices are mutually connected. An advantage of using interconnected but independently controllable devices is that the devices may function under differing operating conditions. For example, multi-purpose microprocessors and microcontrollers are capable of performing a large range of activities, particularly in a control environment. However, when processing digitised signals in real-time, a higher rate of processing is often required and this may be achieved using devices constructed for performing a relatively low number of high speed real-time operations, including signal multiplications. Devices of this type have become known as digital signal processors and these processors may be acquired as general purpose devices or included as part of an application specific integrated circuit.

A problem with including different types of processing devices within a common working environment is that difficulties occur when it is necessary for the processors to communicate. A particular problem occurs when microcontrollers are required to communicate with digital signal processors, given that digital signal processors generally operate at a much higher speed than microcontrollers and the rate at which data is generated by a digital signal processor may be far greater than that at which a microcontroller may be able to accept it. Similarly, if the digital signal processor is instructed to receive data from a microcontroller, it may be frozen out from doing other work for a relatively long period of time, thereby reducing the overall efficiency of the system.

SUMMARY OF THE INVENTION

According to an aspect of the present invention, there is provided a data interface positionable between a first processing means an d a second processing means, comprising storage means arranged to buffer data signals generated by each of said processing means for reception by the other of said processing means, and storage allocation means arranged to adjust the amount of said storage available for transfer in each particular direction.

Thus, an advantage of the present invention is that it provides a continually addressable storage area which may be addressed so as to buffer data generated by the first processing means, for transfer to the second processing means, or to buffer data generated by the second processing means for transfer to the first processing means. At any one time, a particular storage location is allocated for transfer in one of said directions. However, the storage allocation means is provided to adjust the allocation, such that maximum benefit is derived from the available memory locations.

In a preferred embodiment, the adjustment of memory allocation is made in response to requests by one or both of said processing means.

Preferably, one of said processing means is a digital signal processor. Preferably, one of said processing means is a microcontroller or a microprocessor.

In a preferred embodiment, the interface is positionable between processing means provided within a mobile telephone.

BRIEF DESCRIPTION OF THE DRAWINGS

The invention will now be described by way of example only, with reference to the accompanying drawings, in which.

DETAILED DESCRIPTION OF THE INVENTION

Figure 1:
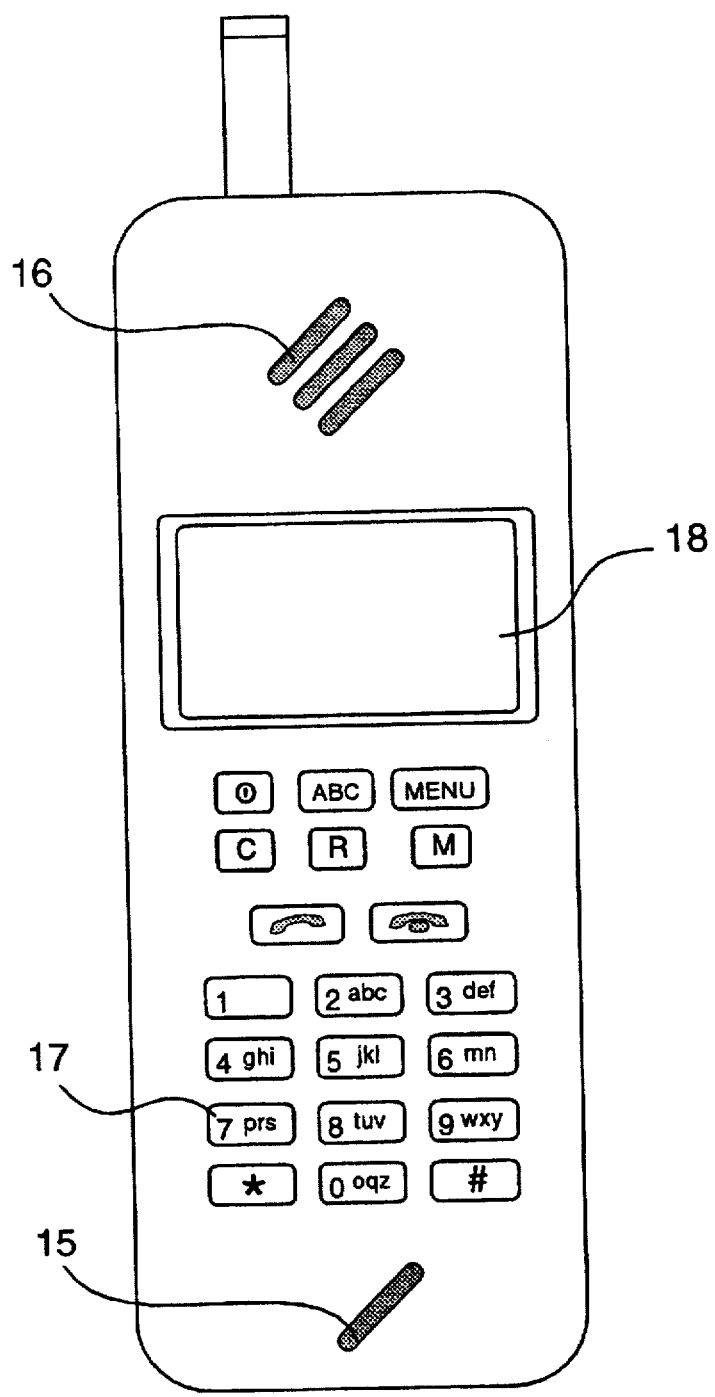
FIG. 1 shows a mobile telephone with internal circuitry including a microcontroller subsystem and a digital signal processor subsystem.

A mobile telephone is shown in FIG. 1, having a mouthpiece microphone 15 and an earpiece loudspeaker 16. Conventional signalling buttons 17 are provided, enabling telephone numbers to be dialled and supplementary telephony services to be effected. A liquid crystal display 18 provides a visual display to an operator, arranged to display selected telephone numbers and provide indications of other operating characteristics.

Figure 2:
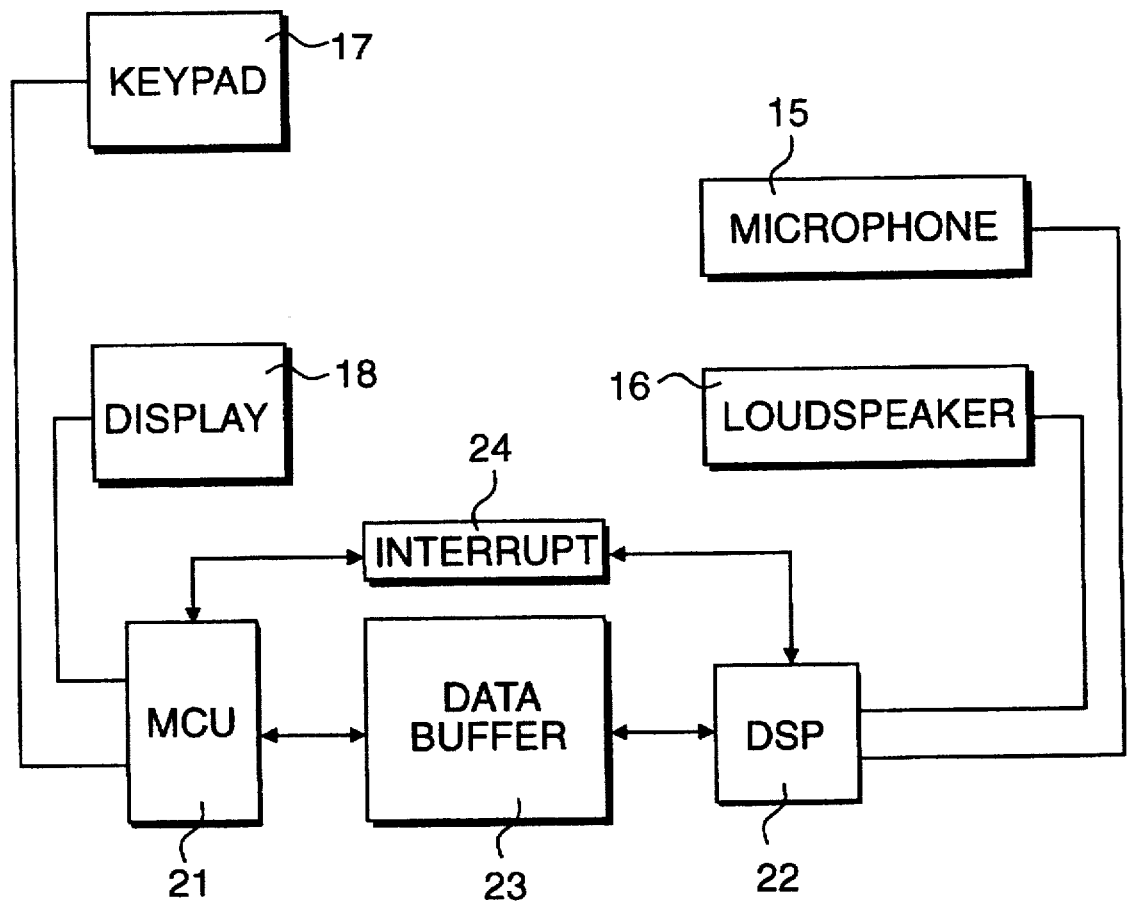
FIG. 2 illustrates the arrangement of the microcontroller subsystem and the digital signal processor subsystem of the telephone illustrated in FIG. 1, including a data buffering circuit for allowing communication between the subsystems.

The internal circuitry for the telephone shown in FIG. 1 is shown diagrammatically in FIG. 2, with similar references being given to similar components. The keypad 17 and the display 18 operate under the control of a microcontroller subsystem (MCU) 21. The microcontroller subsystem 21 is responsible for the overall operation of the telephone handset and is particularly important when overseeing signalling operations and controlling operating characteristics, such as effecting frequency modifications when operation is switched between cells. However, the microcontroller subsystem is not capable of processing real-time digital speech signals and for this purpose a digital signal processor subsystem (DSP) 22 is provided. Thus, the digital signal processor subsystem receives audio signals from the microphone 15 and supplies audio signals to the loudspeaker 16.

Although each processor performs its own specific tasks, it is necessary, at regular intervals, for the microcontroller subsystem 21 to communicate with the digital signal processor subsystem 22. This communication is facilitated by the provision of a data buffering circuit 23. In particular, the microcontroller subsystem may write data to the buffer 23 which is internally buffered by said buffer, thereby allowing the microcontroller subsystem to resume its local processing. Once written to the buffer 23, data may be accessed by the digital signal processor subsystem 22, such that the transfer of data from the microcontroller subsystem 21 is effected under the control of its own system clock, at speeds compatible with the operation of the microcontroller subsystem 21, whereas the reception of data from the interface by the digital signal processor subsystem, is effected by its own internal clock, thereby ensuring that data transfer takes place at speeds compatible with the operation of both subsystems.

Similarly, data transfers may take place in the opposite direction. Thus, the digital signal processor subsystem 21 may write data to the interface 23, at rates compatible with the operation of said processor, whereafter the data may be read from the interface 23 under the control of the microcontroller subsystem 21.

The MCU sub-system 21 and the DSP sub-system 22 run programs which retain information identifying storage areas within the buffer area 23 to which each sub-system may write to and from which each sub-system may read from. After a sub-system has written data to the data buffer 23 it issues an interrupt to the other sub-system via an interrupt circuit 24. Thus, once interrupted via circuit 24, a sub-system will, when appropriate, execute a sub-routine so as to read the data from the data buffer 23 that has been written to said buffer from the other sub-system. The interrupt circuit 24 is also arranged to receive interrupt signals from other devices, not shown in FIG. 2, prioritise these interrupts and, where necessary, mask interrupts to prevent essential operations from being disturbed.

Figure 3:
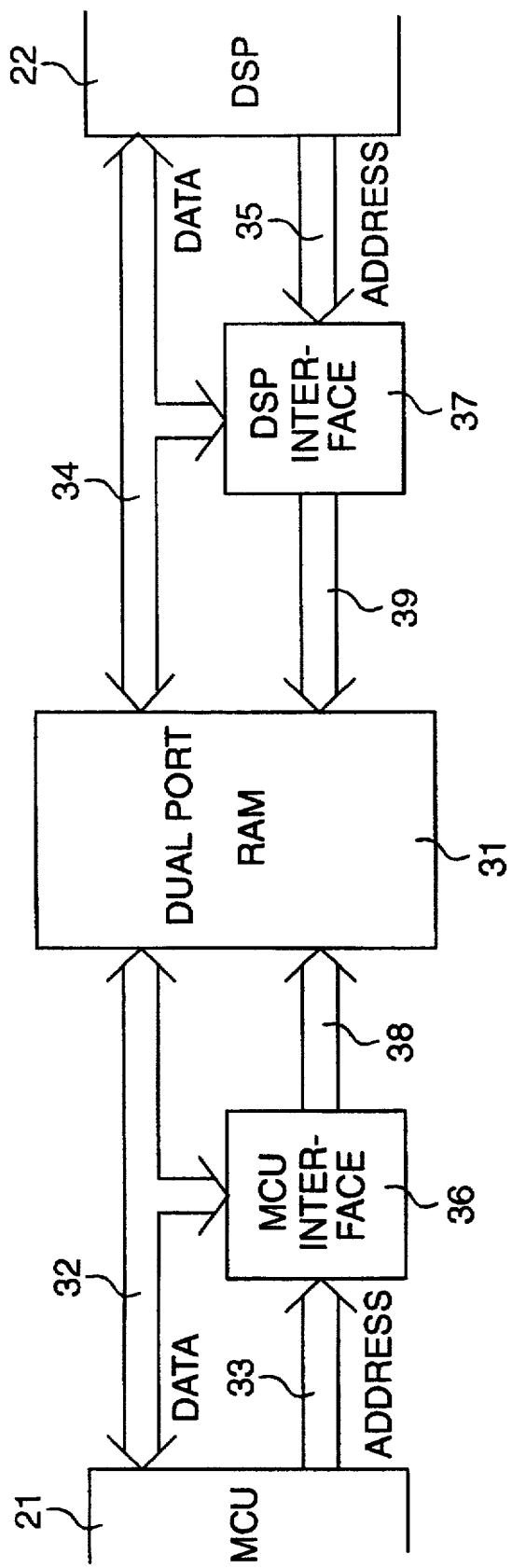
FIG. 3 details the data buffering circuit shown in FIG. 2, including a dual port randomly accessible memory device and interface circuits connecting said memory device to a micro controller unit and a digital signal processor.

The data buffer 23 is detailed in FIG. 3. The buffer includes a dual port random access memory device 31 that may be provided, for example, with sixty-four addressable locations, each capable of storing 8 bits of data. Memory locations within the RAM 31 may be used to buffer data being transferred from the MCU system 21 to the DSP system 22 and to facilitate the transfer of data in the reverse direction, from the DSP sub-system 22 to the MCU sub-system 21. Thus, the buffer is effectively positionable between a first processing environment and a second processing environment and comprises storage arranged to buffer signals generated by each of the said processing environments. At any particular time, storage locations within the RAM 31 are allocated as being part of the storage available for transfers in one direction or for transfer in the other direction. Thus, interface circuits are provided that include registers for maintaining a record of the allocation of storage within the RAM 31 along with systems for effecting reallocation so as to adjust the amount of storage available for transfer in each of the directions.

The MCU sub-system 21 has an associated data bus 32 and an associated address bus 33. Similarly, the DSP sub-system 22 has a data bus 34 and an address bus 35. The MCU data bus 32 is connected directly to the RAM 31, via its first port and, similarly, the data bus 34 of the DSP 22 is connected directly to the second port of the RAM 31.

The MCU address bus 33 is connected to an MCU interface circuit 36, which is also connected to the MCU data bus 32. Similarly, a DSP interface 37 receives address signals over the DSP address bus 35 in addition to receiving data signals from the DSP data bus 34. The MCU interface 36 and the DSP interface 37 provide addressing signals to the RAM 31 over respective RAM address lines 38 and 39.

Both the MCU sub-system 21 and the DSP sub-system 22 address storage locations within the RAM 31 as if they occupied a single addressable location.

Thus, the respective address, representing the RAM 31, is supplied to address lines 33 or 35 which are in turn interpreted by the respective interfaces 36 and 37. When addressed in this way, a plurality of data words may be supplied to the respective data buses, 32 or 34, resulting in the data being written to the RAM 31 in response to address signals generated by the respective interfaces 36 and 37. Thus, the interfaces 36 and 37 include address pointers which are incremented as data is written to the dual port RAM 31. Similarly, these pointers are also incremented as data is read from the RAM 31.

A proportion of the storage locations within the RAM 31 are provided to facilitate transfers from the MCU 31 to the DSP while the remainder are provided to effect transfers in the opposite direction. However, the point at which the crossover occurs is adjustable and controlled in response to programs executed on the sub-systems.

In the preferred embodiment, only the MCU sub-system 21 is capable of adjusting the position at which the crossover occurs and when the DSP 22 requires additional storage locations within the RAM 31, it must request the MCU 21 to provide this additional space. Requests of this type are made by the DSP issuing a command which is supplied over address bus 34, stored within the RAM 31 and thereafter read from said RAM 31 and processed by the MCU 21. Thus, messages generated by the DSP 22 are encoded such that they will be acted upon by the MCU 21 or supplied to other processing equipment.

The MCU sub-system 21 includes a read-only flash memory. This memory is provided so as to retain programs executable within the MCU environment 21, along with programs executable within the DSP environment 22. Thus, the DSP is arranged to operate under instructions supplied from local volatile memory but, in response to a power-up condition, programs executable by the DSP sub-system 22 must be downloaded from the flash memory under the control of the MCU sub-system 21.

All transfers from the MCU sub-system 21 to the DSP sub-system 22 are effected via the RAM 31, therefore, in order to effect the downloading of programs to the DSP sub-system 22, the split point of the RAM 31 is modified, such that the amount of buffering storage available for transfers from the MCU 21 to the DSP 22 is maximised. Thus, for example, in the embodiment where a total of sixty-four storage locations are provided, sixty-two of these locations may be allocated for transfers from the MCU 21 to the DSP 22, until the DSP has received a full complement of executable programs from the MCU's flash memory. Thereafter, the DSP may issue commands to the MCU so as to re-allocate the split point such that messages larger than 2 bytes may be transferred from the DSP to the MCU 21. In this way, the available capacity within the RAM 31 is optimised and allocated for transfers in either direction, substantially in response to instantaneous demand.

Figure 4:
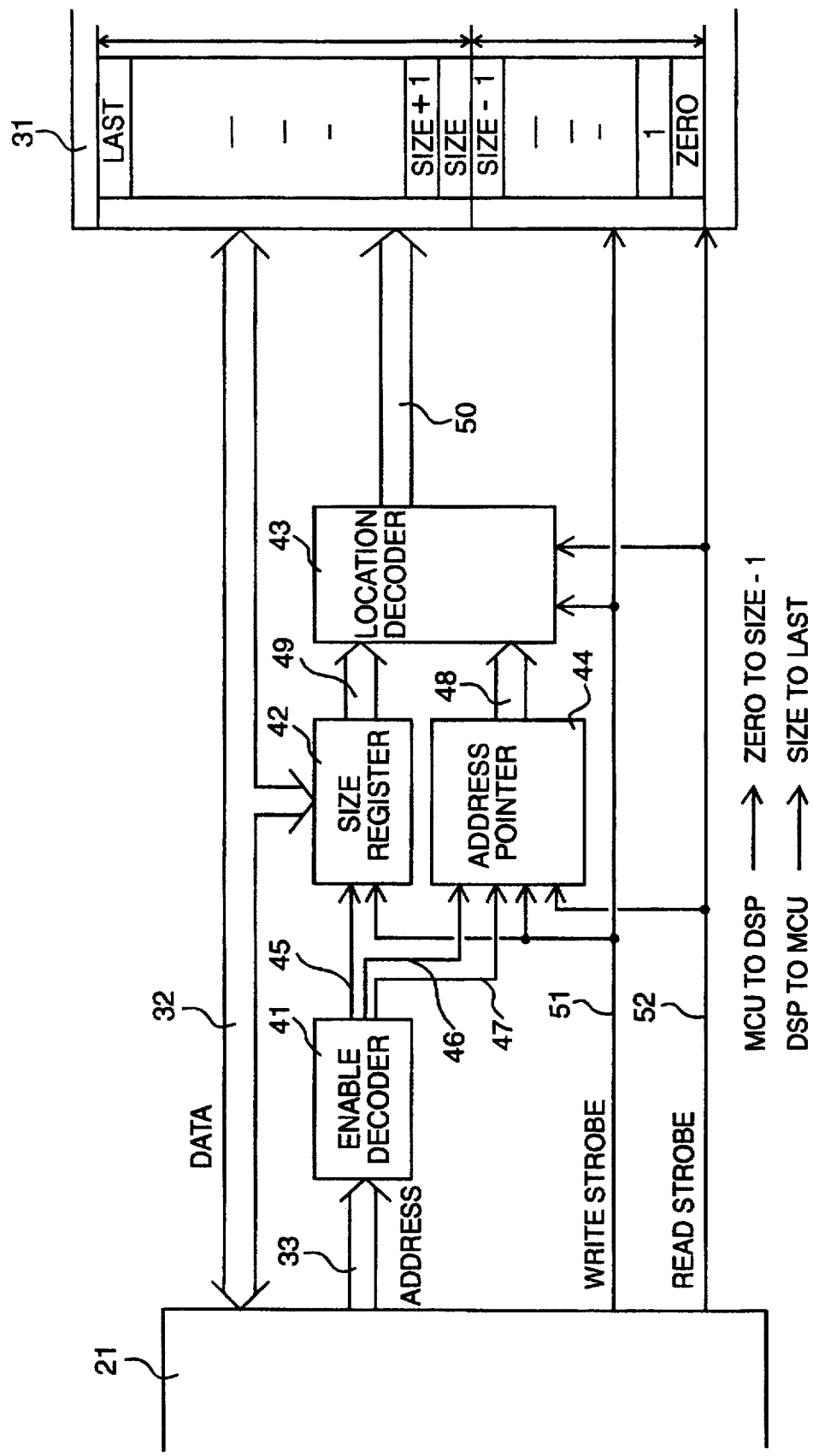
FIG. 4 details one of the interface circuits shown in FIG. 3.

The MCU interface 36 is detailed in FIG. 4 and includes an enable decoder 41, a size register 42, a location decoder 43 and an address pointer 44. The enable decoder 41 receives address signals from the MCU's address bus 33 and includes combinational logic arranged to detect specific address signals generated by the MCU. In particular, the MCU sub-system 21 may generate three specific addresses which are decoded by the enable decoder 41.

A first address signal, to which the enable decoder 41 is responsive, is interpreted by the enable decoder 41 resulting in an enabling signal being supplied to the size register 42 over an enabling line 45. Once enabled in this way, the variable "SIZE", stored in register 42, may be updated, in response to data supplied over the data bus 32. Thus, in this way, it is possible for the MCU sub-system 21 to effectively re-establish a new split point within the RAM 31.

The second address, to which the enable decoder 41 is responsive, is interpreted as an address pointer re-set signal which is supplied to the address pointer over a re-set line 46. In response to receiving a re-set signal, the address pointer 44 is re-set, so as to effectively re-initiate a reading or writing operation.

The third address, to which the enable decoder 41 is responsive, is interpreted as an address pointer enable command, resulting in an enabling signal being supplied to the address pointer 44 over an enabling line 47. Thus, when enabled in this way, the address pointer 44 generates incremental address signals, which are supplied to the location decoder 43 over a first internal address bus 48. A similar second internal address bus 49 supplies addressing signals from the size register 42 to the location decoder 43 and in response to these two signals an address signal is supplied to the RAM 31 over a third internal address bus 50.

Memory locations within the RAM 31 are schematically illustrated in FIG. 4. Thus, the first addressable location may be identified as location "ZERO" and the last location may be similarly identified as location "LAST". In a preferred embodiment the RAM 31 contains a total of sixty-four memory locations, from ZERO to sixty-three, i.e. last equals sixty-three. Each location is arranged to store an eight bit byte and at least two bytes must be reserved for transfers in each direction. It is essential for a reservation of this type to be made, such that bandwidth is provided, by means of these two byte locations, enabling requests for additional buffering space to be made from one environment to the other. In particular, given that the MCU sub-system controls the position of the split point, at least two bytes of data must be permanently allocated for transfers from the DSP to the MCU.

At any particular time, the position of the split point is known to both the MCU software, the DSP software and register 42. The register 42 is readable by both the MCU and the DSP 22 but it may only be written to by the MCU.

The value stored in the size register 42 defines the lowest location for transfers from the DSP to the MCU. The variable "SIZE" may therefore have a value anywhere between two, identifying location two within the memory and sixty-two, identifying location sixty-two in the memory, where location sixty-three is the last location in the said memory. Thus, transfers from the MCU to the DSP are made via locations ZERO to SIZE-1 and transfers from the DSP to the MCU are made by locations SIZE to LAST.

A location decoder 43 converts an address generated by the address pointer 48 into an address which may be used to address the RAM 31. The MCU software and the DSP software both know the availability of memory allocated for transfers in each direction, however the value of variable "SIZE" is also transferred to the location decoder 43, over bus 49, so as to provide a further mechanism, within the location decoder 43, to prevent the address pointer 48 straying beyond its allocated region during a read or a write operation. Furthermore, the location decoder 43 is also instructed, via appropriate read and write strobe signals, as to whether a write operation or a read operation is being executed. In this way, the addresses generated by the address pointer 44 may be used for both reading and writing, with an appropriate off-set applied by the location decoder 43 when reading.

As previously stated, when the system is initially powered up it is necessary for DSP programs to be transferred from flash memory, forming part of the MCU sub-system, to volatile memory associated with the DSP sub-system. Before such a transfer takes place, the value of variable "SIZE" is maximised (set to sixty-one in the preferred embodiment) so as to allocate as much memory as possible within the RAM 31 for transfers from the MCU to the DSP. Once the DSP software has been loaded, it is executed by the DSP and the overall system is brought into a fully operational state.

For the purposes of this disclosure, it is assumed that, for whatever reason, the DSP now requires to transfer data back to the MCU during a period when transfers in the reverse direction are minimal. Thus, in order to optimise the rate of transfer from the DSP to the MCU, it is appropriate to allocate additional storage within the RAM 31 for transfers from the DSP to the MCU.

After the transfer of program data from the MCU to the DSP, the value of variable SIZE has been set to sixty-two, such that storage locations sixty-two and sixty-three are the only locations within memory 31 which are available for transfers from the DSP to the MCU. Consequently, the DSP writes a message to these locations requesting the MCU to adjust the size position.

At any point in time, the MCU 21 may write data via its data bus 32 or, to the exclusion of a write operation, it may read data over its data bus 32. Data transfers from the MCU, as part of a write operation, are effected by placing data lines of the data bus to the appropriate logical values representing the data to be transferred. Similarly, address lines on the address bus 33 are modified so as to represent the write address. These operations take a finite period of time, in order for data levels to reach their appropriate point. Thereafter, a write strobe signal, in the form of a rising edge, is applied to a write strobe line 51, resulting in the data defined by the data bus being written to the address specified by the address bus.

A similar operation is performed as part of the reading function. The data port of the MCU is placed in a condition whereby it is ready to receive data. Address lines on the address bus 33 identify the location from which the data is to be read. Thereafter, a read strobe, in the form of a rising edge, is generated on the read strobe line 52, resulting in the data identified by the address bus 33 being read to the MCU 21 over its data bus 32.

In the example identified above, the DSP sub-system will have written an instruction to locations sixty-two and sixty-three of the RAM 31 which will in turn instruct the MCU 21 to allocate more memory space within RAM 31 for transfers from the DSP to the MCU, i.e. to reduce the value of variable "SIZE".

After successfully writing the instruction to the RAM 31, the DSP sub-system issues an interrupt to the MCU via the interrupt circuitry 24 effectively instructing the MCU to the effect that it has been mailed a message which it needs to read from what may be considered as its mailbox.

The MCU responds to the interrupt by generating an address on its address bus 33 to the enable decoder 41 which is interpreted by the decoder as an address of the second type. Thus, in response to receiving this address signal, the enable decoder 41 generates a re-set signal for line 46, resulting in the address pointer being re-set to zero. Thereafter, an address of a third type is supplied to the enable decoder 41 resulting in the decoder supplying an enabling signal to the address pointer 44 over the enabling line 47. Thus, in response to this enabling signal, the address pointer 44 is effectively instructed to generate address signals to the location decoder 43.

The enabling address on address line 33 is maintained throughout the read operation, such that, from the MCU's point of view, a plurality of data bits are being received over its data bus in response to an address signal effectively addressing the same logical memory location. However, actual addresses to the dual port RAM 31 are incremented in response to address signals generated by the address pointer 44.

In response to address signals generated over address bus 33, data is read by the MCU over data bus 32 under the control of read strobe signals generated over the read strobe line 52. The read strobe signals are supplied to the address pointer 44 and are also supplied to the location decoder 43. In response to receiving a read strobe signal, the location decoder 43 is instructed to the effect that a transfer is talking place from the DSP to the MCU. Consequently, the area of storage within the RAM 31 which is to be addressed lies within the range defined by the variable SIZE to position LAST. Thus, under the present conditions, the location decoder 43 will only generate addresses over address bus 50 identifying location sixty-two and location sixty-three.

The address pointer 44 has been re-set therefore it will initiate the generation of address signals starting from address ZERO. On receiving the next read strobe on read strobe line 52, address pointer 44 generates a value over address bus 48 representing location ZERO within the RAM 31. However, given that the read strobe has also been supplied to the location decoder 43, an offset, equivalent to the value SIZE, specified by the value received from bus 49, is added to the address received from bus 48, resulting in address SIZE plus ZERO being supplied to bus 50 resulting in location sixty-two being addressed by said bus.

The read strobe on line 52 is supplied to the RAM 31, thus, as address SIZE plus ZERO is supplied over bus 50, the appropriate location is read within the RAM 31, resulting in the data stored at location SIZE plus ZERO, i.e. location sixty-two, being supplied to the MCU sub-system over data bus 32.

On the next cycle, the read address is maintained on bus 33 and the address pointer is maintained enabled. The address pointer is incremented and an address identifying location 1 is supplied on address bus 48. Again, this is offset by the value stored in the size register 42, resulting in the last location being read from the RAM 31 and the data stored therein being supplied to the MCU over data bus 32.

The data received over the data bus 32 will be interpreted by the MCU 21 and in this particular example, it will be interpreted to the effect that the DSP requires additional buffering capacity. In accordance with protocols established within the MCU software, a decision will be made as to the extent to which the value stored within the size register 42 should be increased.

An address signal of the first type is supplied to the address bus 33, resulting in the enable decoder 41 generating an enabling signal over line 45 to the size register 22. The new value for the size register is supplied to the data bus 32 and this value is clocked to the size register 42 in response to a write strobe generated on line 51. The MCU 21 may now generate a message to the DSP to the effect that it has been given additional space within the RAM 31.

During normal operation, the MCU 21 may supply other information to the DSP sub-system 31, in addition to the downloading of its executable programs. The system will be arranged such that, under normal operation, the allocation of space within the RAM 31 will be more or less halved and additional allocation, for transfers in one direction or the other, will only be given if necessary.

To transfer data from the MCU to the RAM 31 an address of the second type is supplied to the enable decoder 41, resulting in the address pointer 44 being reset to zero. The MCU 21 then, as far as it is concerned, addresses a single logical location, representing the RAM buffer, by generating an address over bus 33 of the third type, resulting in the enable decoder 41 enabling the address pointer 44. The first data byte to be transferred is supplied to the data bus 32 and address pointer 44 generates its first address for address bus 48. The first address supplied from the address pointer to the location decoder 43 will be zero, given that the address pointer has been reset and, given that storage location ZERO to SIZE-1 are used for transfers from the MCU to the DSP, no offset will be added by the location decoder 43. However, the location decoder 43 will ensure that addresses generated by the address pointer 44 will not exceed address values supplied by the size register over bus 49.

A write strobe signal is generated over line 51, resulting in the data values supplied to the data bus 32 being written to location ZERO within the RAM 31. Once this transfer has been performed, the address pointer is incremented such that, on receiving the next write strobe signal on line 51, the next data value on bus 32 is supplied to location 1 within the RAM 31. Thus, the transfer will continue byte by byte until the full message has been written to memory locations falling within the range ZERO to SIZE-1.

The data buffer 23 allows the MCU and the DSP to communicate with each other efficiently. However, the level of storage within the data buffer is re-allocatable, such that optimum use is made of this storage space for whichever direction a transfer is taking place.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A data buffer positionable between a first processing means and a second processing means, comprising:

storage means arranged to buffer data signals generated by each of said processing means for reception by the other of said processing means, and programmable storage allocation means arranged to adjust an amount of storage provided by said storage means for buffering data signals generated by each of said processing means;

wherein said programmable storage allocation means is comprised of address generating means for generating addressing signals for the writing of data to said storage means or the reading of data from said storage means; and wherein said address signal generating means is arranged to generate addressing signals initiated from a predetermined value, said address signal generating means further including decoding means for selectively applying an offset to said addressing signals, depending upon whether a writing operation or a reading operation is being performed.

2. A data buffer according to claim 1, wherein said storage means is comprised of a two-port random access memory, having one port for data transfer with said first processing means and a second port for data transfer with said second processing means.

3. A data buffer according to claim 1, wherein said programmable storage allocation means is further comprised of address interpretation means, arranged to enable said address generating means in response to a particular addressing signal generated by said first processing means or by said second processing means.

4. A data buffer according to claim 1, wherein said address generating means is arranged to generate addressing signals initiated from a predetermined value and to increment said addressing signals so as to address a plurality of locations in said storage means.

5. A data buffer according to claim 1, wherein said storage allocation means includes a register defining a location in said storage means that marks a boundary between first storage locations allocated for buffering data signals generated by said first processing means and second storage locations allocated for buffering data signals generated by said second processing means.

6. A data buffer according to claim 1, wherein said first processing means is comprised of a microcontroller and said second processing means is comprised of a digital signal processor, and wherein said data buffer is positioned between said microcontroller and said digital signal processor.

7. A data buffer according to claim 6, wherein said microcontroller is interfaced to a keypad and a display of a mobile telephone and the digital signal processor is interfaced to a microphone and a loudspeaker of said mobile telephone.

8. A method of buffering data being transferred between a first processing means and a second processing means, comprising steps of:

storing data generated by either of said processing means in a storage device;

reading said stored data by the other of said processing means;

and programmably adjusting an amount of storage provided by said storage device for buffering data signals generated by each of said processing means;

wherein the step of programmably adjusting includes a step of generating addressing signals for the writing of data to the storage device or the reading of data from the storage device;

wherein the step of generating addressing signals generates addressing signals initiated from a predetermined value, and further comprising a step of selectively applying an offset to the addressing signals, depending upon whether a writing operation or a reading operation is being performed.

9. A mobile telephone having a first data processor and a second data processor each programmed for performing certain tasks during the operation of said mobile telephone, said mobile telephone comprising:

a two port storage device comprised of X storage locations, said two port storage device having a first input/output port coupled to a data path of said first data processor and a second input/output port coupled to a data path of said second data processor, said two port storage device having, at any given time, Y storage locations allocated to said first data processor for storing data within and Z storage locations allocated to said second data processor for storing data within, where X is at least equal to Y+Z; and a programmable control circuit coupled to said storage device, said programmable control circuit having a programming input coupled to at least one of said data processors, said control circuit being responsive to programming information received through said programming input for setting the values of Y and Z;

wherein said first data processor is comprised of a microcontroller and said second data processor is comprised of a digital signal processor; and wherein wherein during an initialization procedure of said mobile telephone said microcontroller transmits at least a portion of an operating program to said digital signal processor through said two port storage device, and wherein during said initialization procedure said programmable control circuit is programmed such that Y>Z.

10. A mobile telephone according to claim 9, wherein said microcontroller is interfaced at least to a user interface portion of said mobile telephone and said digital signal processor is interfaced at least to a voice handling portion of said mobile telephone.

* * * * *